United States Patent [19]
Giuffrida

[11] 3,964,985
[45] June 22, 1976

[54] ELECTRODIALYSIS APPARATUS AND PROCESS FOR ION MODIFICATION

[75] Inventor: Anthony J. Giuffrida, North Andover, Mass.

[73] Assignee: Ionics, Incorporated, Watertown, Mass.

[22] Filed: Oct. 29, 1974

[21] Appl. No.: 518,587

[52] U.S. Cl. .............................. 204/180 P; 204/301
[51] Int. Cl.² ......................................... B01D 13/02
[58] Field of Search .......................... 204/180 P, 301

[56] References Cited
UNITED STATES PATENTS

| | | | |
|---|---|---|---|
| 2,921,005 | 1/1960 | Bodamer | 204/180 P X |
| 3,086,928 | 4/1963 | Schulz | 204/180 P X |
| 3,165,415 | 1/1965 | Kilburn et al. | 204/180 P X |
| 3,330,749 | 7/1967 | Kuwata et al. | 204/180 P |
| 3,687,682 | 8/1972 | Scheder | 204/180 P X |
| R28,192 | 10/1974 | Schulz | 204/180 P |

*Primary Examiner*—John H. Mack
*Assistant Examiner*—A. C. Prescott
*Attorney, Agent, or Firm*—Norman E. Saliba

[57] ABSTRACT

An aqueous solution of a metal salt solution is converted to the corresponding acid by hydrogen ion substitution in a four compartment electrolytic cell containing three cation permselective membranes or barriers for defining the cell compartments. In one specific embodiment the salt solution initially treated in the intermediate compartment located adjacent to the cathode compartment is further treated by passing into the intermediate compartment located adjacent the anode compartment and thereafter removing the same as the final acid product. Such a flow arrangement prevents or reduces loss of hydrogen or citrate ions into the cathode compartment resulting in an increased acid yield with increased current efficiency.

6 Claims, 1 Drawing Figure

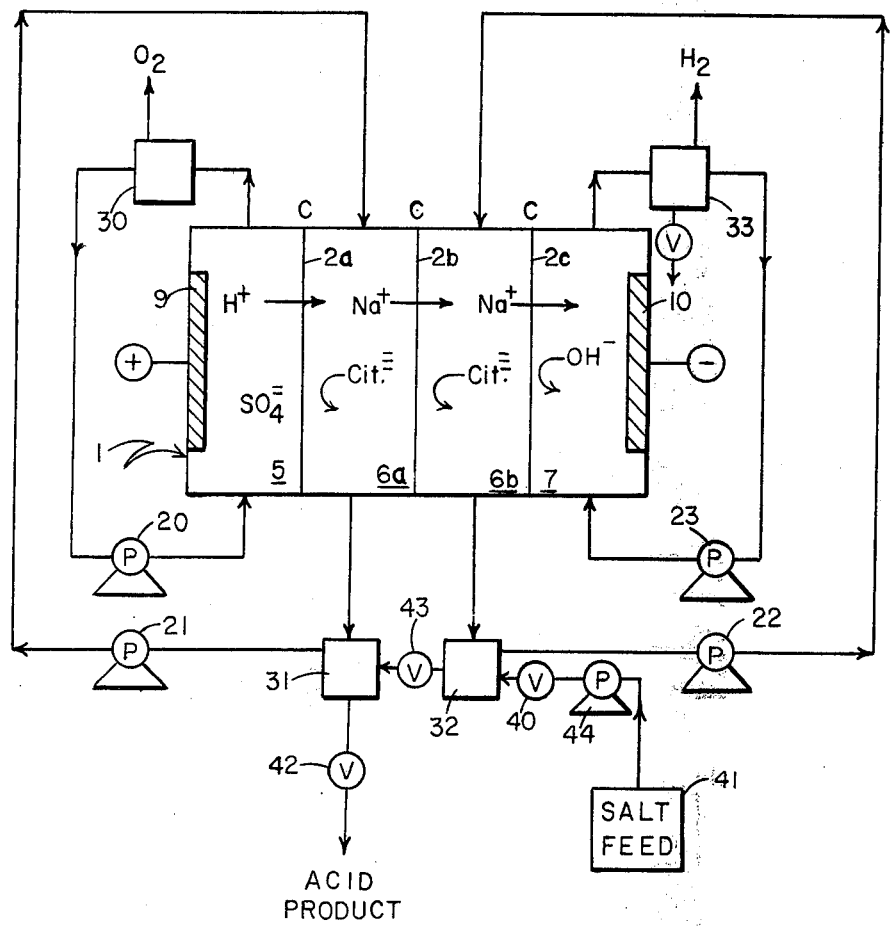

ELECTRODIALYSIS APPARATUS AND PROCESS FOR ION MODIFICATION

This invention relates to an improved electrolytic process and apparatus for converting water soluble acid salts to the corresponding acid itself. More particularly the invention concerns a four compartment electrolytic all cation membrane cell and the manner of processing a solution of a metal carboxylate salt to convert the same into the corresponding carboxylic acid.

For the electrolytic conversion of weak acid salts to the corresponding weak acid an arrangement is known (U.S. Pat. No. 2,921,005) in which a single intermediate compartment (or an uneven number of intermediate compartments) is located between the end electrode compartments with the individual intermediate compartment(s) bounded on both sides by cation exchange permselective membranes. In the case of the three compartment cell the salt solution to be converted is passed through the single intermediate compartment formed between the anode and cathode compartment. A solution of a mineral acid is passed through the anode compartment. When a potential difference is applied across the end electrodes, the hydrogen ions from the mineral acid solution (anolyte) as well as the cations from the salt solution located in the single intermediate compartment, migrate into the respective adjacent compartments in the direction of the negatively charged cathode. The anions however remain in their respective compartments since the cation membranes are substantially impermeable to the passage of anions. As a result of the cation transfer, (replacing the cation of the salt solution with hydrogen) a free weak acid is formed from the original salt solution located in the single intermediate compartment.

Use of this above described prior art method does not allow for the preparation of a reasonably pure solution of the acid at high yields since a state of equilibrium is established which is partly determined by the dissociation constant of the acid and the ratio of the transport number of the hydrogen ion to that of the cation of the acid salt employed. The higher the dissociation constant of the acid and the smaller the ratio of the transport number of hydrogen ions to that of the salt ions for example sodium ion, then the smaller will be the percent conversion of the salt into the free acid.

It has now been found by the present invention that the cations, especially the alkali metal cations in an aqueous solution of an acid salt can be replaced more completely with hydrogen ions by use of two intermediate compartments between the terminal electrode compartments to form a total of four compartments. This four compartment cell is a specific embodiment of the present invention. The use of such a cell employing all cation membranes is especially suited for the preparation of acids from those salts which are subject to electrolytic oxidation since in the present invention the oxidizable material is not allowed to contact the anode which would induce its decomposition. Thus the invention can be successfully employed to produce for example the aminocarboxylic acid type complexing agents such as glycine ($NH_2CH_2COOH$), diglycine $NH(CH_2COOH)2$ also known as (iminodiacetic acid), triglycine and other carboxylic acids such as citric ($H_8C_6O_7$) tartaric, acetic, acrylic, maleic, ascorbic, and the like: Weak inorganic acids such as sulfurous may also be produced by the present invention.

Various objects and advantages will be apparent to one skilled in the art upon reading the following disclosure and the novel features will be particularly pointed out hereinafter in connection with the appended claims. It is to be understood that the details may be modified without departure from the principles of the invention which is readily understood when taken in connection with the accompanying drawing. For the purpose of simplicity the various valves, flowmeters, pressure gauges, pumps, switches etc. which one skilled in the art might employ are not all fully illustrated in the drawing which is a diagrammatic representation of a system employing the principles of the four compartment electrolytic cell.

The process for carrying out the invention will be described by way of example by reference to the apparatus shown schematically in the drawing and in particular to the employment of sodium citrate as the carboxylic salt feed solution to the electrolytic cell.

Sodium citrate is a relatively well ionized salt and therefor has a relatively high electrical conductivity which will allow a reasonable high current passage at low voltages. The sodium citrate salt has a lower solubility than citric acid; a weak acid which is much less ionized than the salt. The acid has a relatively low electrical conductivity so that in a mixture of the salt and acid, most of the current will be passed or carried by the positively charged sodium ion.

The cell of the drawing is divided into four distinct and separate compartments by partitions of cation permselective membranes (c). As noted, a container is provided with cation permselective membrane 2a, 2b, 2c that divide the container into four separate chambers or compartments 5, 6a, 6b, 7. Cation permselective membranes are well known in the art and are readily available commercially. The anode compartment 5 contains the anode 9 or positive electrode and the cathode compartment 7 contains the negatively charged electrode or cathode 10. The pair of intermediate compartments, 6a and 6b are located between the end electrode compartments 5, 7. In operation, the anode 9 and cathode 10 are connected to a suitable source of direct current (not shown).

In the practice of the invention, the four solution streams passing through the four chambers 5, 6a, 6b, 7 of the cell are recirculated by pumps 20, 21, 22, 23 through the respective recirculating holdup tanks 30, 31, 32, 33. Where the cell is employed in a batch type operation, the two streams being recirculating through the intermediate compartments 6a, 6b are not intermixed with each other. A batch volume of each solution is merely recirculated through the respective hold up tanks. Thus in a batch operation the valve 40 controlling the feed of fresh salt solution into the salt recirculating holdup tank 32 is closed. Also closed would be the outlet valve 42 connected to the acid recirculating holdup tank 31 which is normally employed to remove from the system the acid so produced. Initially both intermediate compartments 6a, 6b would be charged with a volume of sodium citrate salt solution and continuously recirculated until the desired percent conversion of the salt to the acid is attained in the intermediate acid product compartment 6a where it is removed essentially as the citric acid product. Thereafter in actual practice the resulting batch of solution from the salt recirculation tank 32 containing a mixture comprised primarily of sodium citrate but with some citric acid would be transferred into the acid recirculation tank 31 via an interconnecting valve 43 or by other transfer means and a fresh batch of sodium citrate solution from the salt storage tank 41 would be charged into the salt recirculation tank 32 in preparation for the next batch operation.

In a feed and bleed operation, fresh salt solution from the storage tank 41 is continuously added into the salt recirculation tank 32 or system at a controlled rate as through the use of a metering type pump 44 or the like. In turn the overflow or bleed of solution from the salt recirculation tank is allowed to continuously pass into the acid recirculation tank 31 via an interconnecting valve 43 and thereafter become admixed with the acid recirculating solution. The overflow then occurring from the acid recirculation tank 31 is continuously collected as the acid via the product valve and line 46.

An alternate flow arrangement is to continuously recycle a salt solution in series flow through the pair of intermediate compartments so that the effluent from the salt compartment 6b is passed as the influent to the acid compartment 6a and the effluent of the said acid compartment then becomes the influent to the salt compartment. Thus the solution which is being continuously recirculated in series flow through both compartments can be operated if so desired in a batch wise or feed and bleed manner.

During operation of the four compartment cell the acidic anolyte and the basic catholyte solutions are recirculated preferably in a feed and bleed arrangement. An aqueous solution of a mineral acid such as sulfuric and a weak alkali hydoxide solution may be employed as the respective electrode solutions.

In a commercial plant for utilizing the process on a large scale, a stack module of four chamber cells of the kind above described may be used. The stack module may consist of a number of such cells assembled side by side and held together by suitable mechanical means such as end plates and/or tie rods. The number of cells in the module can vary according to the size of the plant operation. If the number of cells is not too great, the individual four compartment cells may be conveniently connected electrically in series. If the number of cells is too large for efficient electrical supply by use of a series of connection, the individual cells or smaller groups of series connected cells can be electrically connected in parallel to electrical bus bars suitable for supplying each cell with electric current at about the same voltage. The pipe connections for supplying and withdrawing liquid from the respective cell chambers are arranged so that liquid may be independently supplied to or withdrawn from all the anode chambers, or all the intermediate chambers, or all the cathode chambers in the stack. A direct current is passed transversely through the individual cells from across the end electrodes resulting in the migration of ions towards the electrode of opposite electrical charge.

The chemical and electrochemical reactions taking place in the respective cell chambers during the operation of the cell are as follows. In the anode chamber 5 the sulfuric acid is ionized according to the following equation: $H_2SO \rightarrow 2H^+ + SO_4^{--}$. These ions carry the current through the anode chamber. Also in the anode chamber some of the water is electrolyzed by the following reaction: $H_2O \rightarrow 2H^+ + \frac{1}{2}O_2 + 2e^-$. The $O_2$ gas thus formed is released at the anode. It can be discharged into the atmosphere or may be collected for use, if desired.

The positively charge $H^+$ ions generated at the anode will under the influence of the electric potential, migrate from the anode compartment or chamber 5 through cation membrane 2a into the first adjacent intermediate acid compartment 6a. A certain amount of the hydrogen ions entering said intermediate compartment 6a will along with positively charged sodium ions pass through cation membrane 2b into the next adjacent intermediate salt feed compartment 6b where it will then be carried along with the flow of sodium citrate ($Na_3H_5C_6O_7$) solution passing through and out of the said compartment 6b. The use of the intermediate salt compartment 6b is critical to the present apparatus and process since it acts as a buffer zone between the intermediate acid product compartment 6a and the cathode compartment 7. Without this buffer zone as would be the case in the prior art three compartment cell, the hydrogen ions passing through the cation membrane 2b would migrate into the basic cathode compartment 7. These hydrogen ions are thus not available to combine with the citrate ions to form an acid and would therefor decrease the overall efficiency of the process. The intermediate salt compartment 6b functions to pick up or entrap the entering hydrogen ions and therafter returning them back to the adjacent intermediate acid compartment 6a where the hydrogen ions are utilized in an ion substitution process to form the required acid as follows:

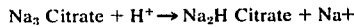

$Na_3$ Citrate $+ H^+ \rightarrow Na_2H$ Citrate $+ Na+$

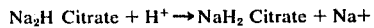

$Na_2H$ Citrate $+ H^+ \rightarrow NaH_2$ Citrate $+ Na+$

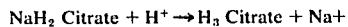

$NaH_2$ Citrate $+ H^+ \rightarrow H_3$ Citrate $+ Na+$

It has further been observed during actual operation that at a pH of about less than 3, that is at high salt to acid conversions, the carboxylic acid so produced in the intermediate acid compartment 6a has a tendency to become positively charged. Thus without the use of the buffer zone formed by the intermediate salt feed compartment 6b loss of the citrate ion into the cathode compartment would also occur to some extent. The prior art three compartment cell at low conversions not only tend to lose citrate ions to the anolyte but at high conversions allows great loss of citric acid to the catholyte.

Continuing the description of the present process, the positively charge $Na^+$ ions from both intermediate compartments 6a, 6b pass or migrate through the cation exchange membranes 2b, 2c into the cathode chamber 7 under the influence of the electric potential, whereas the negatively charged citrate ion (Cit.$^=$) do not. Instead, they react with the positively charged $H^+$ ions entering from the anode chamber to increase the acidity of the sodium citrate solution, as noted in the equations last given above.

In the cathode chamber 7 some of the water of the sodium hydroxide solution is electrolyzed according to the following equation: $2H_2O+2e \rightarrow 2OH^-+H_2$. The $OH^-$ ions react with the $Na^+$ ions entering from the adjacent intermediate chamber 6b to form more sodium hydroxide. The total reaction in the cathode chamber is given by the equation: $2H_2O+2Na^++2e \rightarrow 2NaOH+H_2$. The hydrogen gas ($H_2$) so formed escapes at the cathode, and may be discharged into the atmosphere or collected for use, if desired. As the electrolysis proceeds, the acidity of the sodium citrate solution in the intermediate chambers is continuously increased, while the quantity of sodium hydroxide in the cathode chamber is also constantly increased. Makeup water may be added to the anode chamber as needed to replace the electrolyzed water. Makeup water is also added to the cathode chamber in a quantity sufficient to replace the electrolyzed water and/or to maintain an optimum concentration of sodium hydroxide in the catholyte. Some of the sodium hydroxide solution in the chathode chamber can be continuously bled off it so desired.

The conversion of the salt to the acid is more complete in the intermediate acid compartment 6a located immediately adjacent the anode compartment 5 than it is in the intermediate salt compartment 6b adjacent to the cathode compartment. This is because only hydrogen ions enter compartment 6a whereas both sodium and hydrogen ions enter compartment 6b. Thus the preferred method of removing the acid product from compartment 6a and replacing it with the acid-salt mixture from compartment 6b is most efficient in producing improved acid product yields accompanied by improved current efficiency.

The following examples illustrate how the invention directed to the four compartment cell may be carried into effect; in each case a substantially corresponding operation employing the prior art three compartment cell is described by way of comparison.

Example 1 (Four Compartments-Batch Operation)

A four compartment apparatus of the general type shown in the drawing may be used to demonstrate the electrolytic conversion of sodium citrate into citric acid employing the batch process. The cell has an active working area of 52.5 sq. inches. The electrodes and the three cation membranes are spaced from each other by plastic frames or spacers having a thickness of 0.090 to 0.100 inches. The anode consists of an alloy of lead and antimony having an oxide coating thereon and the cathode of stainless steel. The solution comprising the anolyte is approximately 0.25 normal in sulfuric acid with an approximately two normal sodium hydroxide solution comprising the catholyte. The cell is opeated at a current density of 120 amps per sq. foot (ASF) of active cell area. The salt feed solutions recirculating through both intermediate compartments has an initial concentration of 6 normal in sodium citrate. Constant recirculation of all four streams is maintained. Operation is discontinued when analysis of the solution recirculating through the acid product compartment (6a) shows substantially a 100% conversion to citric acid. At this state there is found an 85% acid conversion in the salt feed compartment (6b); with an overall yield of 100%. Operation at a higher acid conversion of 96% in the salt feed compartment slightly reduces the overall yield of acid to 98%. The current efficiency averaged 83% over the total period of operation.

Example 2 (Three Compartments-Batch Operation)

A three compartment cell of the general type illustrated in the drawing (less one of the intermediate compartments and cation membrane) is used to electrolytically convert the citrate salt into citric acid. Initial concentrations of the electrode streams and salt batch feed solution is the same as Example 1. Current density is 120 ASF. Operation is continued for 270 minutes for an overall currency efficiency of 65% and an overall acid yield of 94%. The initial current efficiency is 85% which decreases gradually until at the end of the run it is a poor 17%.

Example 3 (Four Compartments-Feed and Bleed Operation)

The apparatus of Example 1 is employed to convert the citrate salt into citric acid using a feed and bleed flow arrangement. The run is operated for 2 hours with a feed rate of about 3.8 ml/min of fresh salt solution to the salt feed compartment with an effluent bleed of solution from the acid product compartment of about 3.8 ml/min. A steady state conditions a 99.7% conversion in the acid product compartment (6a) is obtained along with a 90% conversion in salt feed compartment (6b). The overall acid yield is 97% at an overall current efficiency of 83%.

Example 4 (Three Compartments-Feed and Bleed Operation)

The cell and operating conditions in this example is similar to example 2 except for the use of a feed and bleed arrangement. For the purpose of obtaining data at about the 100% conversion point it is necessary to employ a feed stream to the single intermediate compartment which is already 67% converted into the acid component. At steady state conditions a 98.5% conversion is obtainable at a low 30% current efficiency. The overall acid yield is 75%.

Example 5 (Four Compartments-Batch Operation)

This example employing the apparatus and condition of example 1 converted the disodium salt of immino diacetic acid into the acid. At 100% acid conversion and at an 80% current efficiency the overall yield is 99.5%.

Example 6 (Three Compartments-Batch Operation)

This example employing the apparatus and conditions of example 2 converted the disodium salt of immino diacetic acid into the acid per se. At 100% conversion, an 80% overall yield and 65% current efficiency is obtained.

It will be readily noted from the above examples that the use of the four compartment cell of the present invention produces improved efficiencies and yields in the conversion of acid salts to the acid over that obtained by use of the prior art three compartment apparatus having the single intermediate compartment.

The embodiments of the invention in which an exclusive property of privilege is claimed are defined as follows:

1. An ion-modification process for the electrolytic conversion of a water soluble metal salt of an acid into the corresponding acid per se comprising providing a four chamber electrolytic cell having at the terminals ends thereof a cathode and anode electrode chamber respectively and a first and second juxtaposed intermediate chambers placed between said electrode chambers with all four chambers separated from each other by cation permeable diaphragms and with means for separately introducing into recycling and removing fluids from the respective chambers via separate liquid holdup tank means associated with each of said chambers, the process comprising having aqueous acid salt solution in both said first and second intermediate chambers, having conductive aqueous solutions in the electrode chambers, the said anolyte solution being capable of producing hydrogen ions at the anode electrode, imposing a direct current transversely through all four chambers to cause hydrogen ions from the anolyte to migrate through the adjacent cation membrane diaphragm into the said first adjacently disposed intermediate chamber and to cause metal ions from the said salt solution of the said first intermediate chamber to migrate through the next adjacent membrane into the second adjacently disposed intermediate chamber and removing the resulting solution in said first intermediate chamber as the acid product.

2. The process of claim 1 herein the process is carried out as a batchwise operation by continuously recirculating a batch volume of solution through the intermediate chambers and their associated holdup tanks until the desired conversion into the acid product is obtained.

3. The process of claim 2 wherein the initial solution in the first intermediate chamber is a salt and acid mixture obtained from the said second intermediate chamber of a previous run.

4. The process of claim 1 wherein there is continuously supplied a fixed amount of said acid salt solution into the acid salt holdup tank associated with said second intermediate chamber, continuously passing the resulting liquid overflow out of the acid salt holdup tank into the acid product holdup tank associated with said first intermediate chamber, continuously recirculating the liquids in both holdup tanks through the said associated intermediate chambers respectively to thereby effect the substitution of metal ions of the salt solution with hydrogen ions to attain the salt conversion into the desired acid concentration and thereafter collecting as the acid product the solution overflowing from the acid product holdup tank.

5. The process of claim 1 wherein the acid salt is a metal carboxylate salt and the acid product is the corresponding carboxylic acid.

6. The process of claim 1 wherein the acid so produced is selected from the group consisting of glycine, diglycine, triglycine, citric, tartaric, acetic, acrylic, maleic, ascorbic and mixtures thereof.

* * * * *